April 6, 1965  C. RAMSDEN  3,176,712
NON-RETURN VALVE
Filed Sept. 24, 1962

INVENTOR
CLEMENT RAMSDEN

By Shoemaker and Mattare
Attys.

United States Patent Office 3,176,712
Patented Apr. 6, 1965

3,176,712
NON-RETURN VALVE
Clement Ramsden, 10 Prince's Court, Prince's Ave.,
Benoni, Transvaal, Republic of South Africa
Filed Sept. 24, 1962, Ser. No. 225,568
Claims priority, application Republic of South Africa,
Oct. 3, 1961, R 61/1,807
4 Claims. (Cl. 137—496)

This invention relates to a valve controlling an outlet and preventing any return flow therethrough and which can be used in a pipeline or as a foot valve.

Many forms of non-return valves are known and many not only prevent a return of the fluid but are adapted to restrict, to a very large extent, the normal flow. These valves while made of flexible material often require for such material to be moulded to shape to suit the positions they are required to occupy in the pipeline and in the pipe fittings to be used. Also many of the valves are complicated in construction in an effort to make them sensitive to small differences to fluid pressure.

It is the object of this invention to provide a simple and inexpensive non-return valve which will avoid the complications above mentioned and will provide for a direct flow of fluid in the normal direction while being sensitive to small pressure differences in the passing fluid and be silent in operation.

In accordance with this invention a non-return valve comprises a pipe coupling, a rigid baffle plate and a disc of flexible elastic rubber or like material adapted to be clamped together with the plate in the assembly of the coupling, a relatively small solid centre to the plate, radial ribs supporting said centre and a central hole in the disc in diameter less than the said solid centre.

The invention further provides for the material of the disc to be relatively thin and easily stretchable round the central hole and to be bevelled outwardly therefrom; for the rigid plate to be dished outwardly towards the disc and for the centre of the plate to have a semi-spherical knob projecting from its centre and towards the disc.

Figure 1:
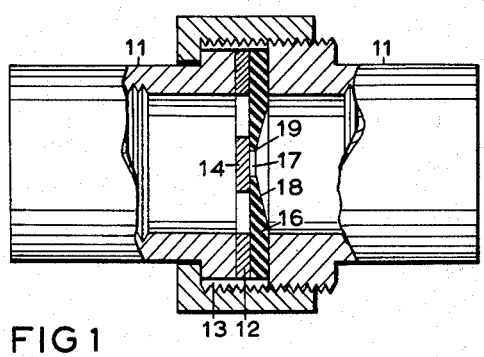
Figure 3:
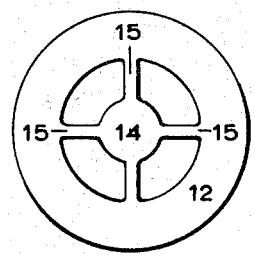
Figure 2:
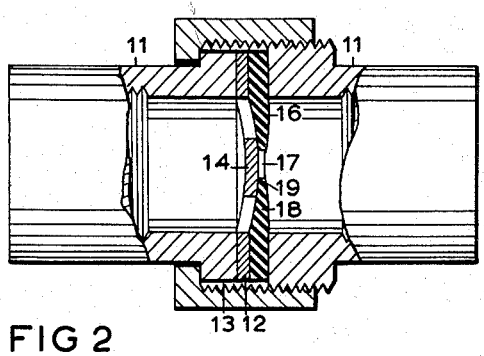
Figure 4:
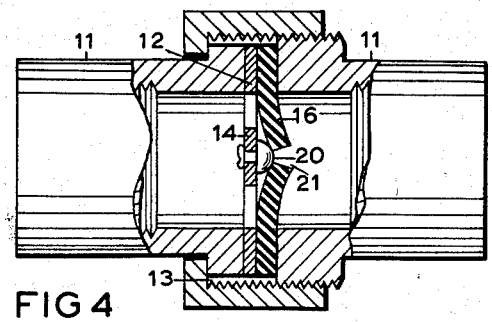
Figure 5:
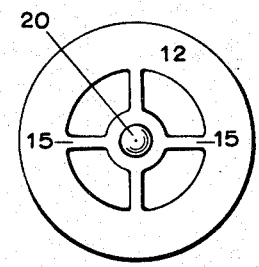

Examples of this invention are shown in the accompanying drawings in which:

FIG. 1 shows in the non-return valve, a flat rigid plate,
FIG. 2 is similar to FIG. 1 but showing a dished rigid plate,
FIG. 3 is a front view of the rigid plate shown in FIGS. 1 and 2,
FIG. 4 is a view similar to FIG. 1 but with a knob fixed to the centre of the rigid plate and a plain hole in the centre of the rubber disc, and
FIG. 5 is a front view of the rigid plate shown in FIG. 4.

In carrying out the invention in one preferred manner the pipe couplings 11, forming a pipe union, would be inserted in the pipeline where a non-return valve is required.

The non-return valve, according to this invention, is made from a plate or disc 12 of rigid material adapted to fit into a socket 13 in the union.

The plate 12 is left solid about its centre 14 which is supported by a number of radial ribs 15.

A disc 16 of rubber or like flexible and elastic material is provided to cover the area of the plate 12. A central hole 17 in the disc 16 is smaller in diameter than the solid centre 14 of the plate 12. As shown the part 18 of the disc 16 surrounding the central hole 17 is bevelled outwardly in FIGS. 1 and 2.

The plate 12 and the disc 16 are both placed in the socket 13 of the union so that the thin edge 19 of the hole 17 rests against the solid central portion 14 of the plate 12. When the couplings 11 are coupled the plate 12 and the disc 16 are clamped together in the socket 13.

The squeezing of the edge of the rubber disc 16 in socket 13 tends to make the rubber expand in the centre so that instead of lying flat against the flat plate 12 it may buckle or stand away from it round about the centre 14. The thinness of the disc 16 about the hole 17 allows the disc to function in a most sensitive manner. However to meet this difficulty and avoid any buckling of disc 16 the plate 12 may be dished as shown in FIG. 2. It will be understood that the valve as described will be sensitive to pass fluid even at a very low pressure but will at the same time resist any back flow or in other words, readily act as a non-return valve.

It will be understood that the action of the valve is to roll back the disc 16 about its central hole when fluid must pass but that it unrolls to become substantially flat when the pressure fluid has passed. This action of the valve takes place very silently.

If the rubber disc 16 is not bevelled but is mounted flat as shown in FIG. 4 the valve can still be made sensitive to the normal flow of fluid. This is done by providing the centre 14 of the plate 13 with a projecting semispherical boss or knob 20. The knob as shown in FIG. 4 comprises part of a rivet. By this means the small area of contact of the disc 16 around the plain hole 21 will allow fluid having very little pressure to pass but the valve will act to resist any back pressure.

As can be seen in FIG. 4 the edge of the hole 21 presses against the rounded face of the knob 20 to close the valve effectively but the valve provides an easy passage past the flexible disc 16 when the flow of fluid is reversed to pass through the plate 12.

In use, any fluid flowing through the pipes 11 towards the plate 12 in the union will press against the portion of the rubber disc 16 covering the openings between the ribs 15 in the plate 12. The pressure of the fluid will force the rubber 16 out of contact with the plate 12, and will pass through the valve. Any tendency for the flow of fluid to be reversed will be resisted by the rubber disc 16 covering the openings between the ribs 15 in the plate 12.

If desired, the rubber disc 16 may have radial cuts dividing it over the ribs 15 in the plate 12.

In the drawings and description a standard form of union coupling has been used, but it will be understood that a coupling with flanges or the like could be used instead of the form shown.

This invention provides a sensitive simple and easily manufactured non-return valve.

What I claim as new and desire to secure by Letters Patent is:

1. A check valve including a pair of pipes having aligned passages and a pair of spaced adjacent ends, means securing the ends of the pipes together, a rigid disc and an elastic disc of rubber like material, said discs being in side by side relation and extending across said passages with said rigid disc supporting said elastic disc, said discs having peripheral edge portions snugly fitting between said pipe ends, said rigid disc having ports therethrough which are radially spaced between the center of said rigid disc and its peripheral edge portions, said elastic disc having a hole through the center thereof, a semi-spherical knob larger in diameter than the hole in said elastic disc secured to the center of said rigid disc and extending into said hole so as to seal same.

2. A check valve as defined in claim 1 wherein said securing means comprises threads on the exterior of one of said pipes, a sleeve threaded on said threads and contacting said other pipe so as to axially urge the other pipe toward said one pipe so as to compress the peripheral edge portions of said elastic disc and cause the center of said elastic disc to curl away from said rigid disc and reduce the contact pressure between said knob and said elastic disc.

3. A check valve as defined in claim 2 wherein both said discs in their unstressed state are flat with parallel sides and said hole is defined by cylindrical surfaces which intersect the flat parallel surfaces of said elastic disc at circular corners, one of said circular corners lightly contacting the outer surface of said knob in sealing relationship.

4. A check valve as defined in claim 3 wherein said knob comprises the head of a rivet which includes a shank extending through the center of said rigid disc.

References Cited by the Examiner
UNITED STATES PATENTS

| | | | |
|---|---|---|---|
| 236,719 | 1/81 | Renton | 137—525.3 XR |
| 2,236,477 | 3/41 | Fuchs | 137—525 |
| 2,517,551 | 8/50 | Eckman | 137—525.3 XR |
| 2,528,796 | 11/50 | Smith | 137—525 XR |
| 2,624,362 | 1/53 | Church | 137—508 XR |
| 2,660,474 | 11/53 | Lee | 137—508 XR |
| 2,789,578 | 4/57 | Goepfrich | 137—525 XR |
| 2,897,835 | 8/59 | Philippe | 137—525.1 XR |
| 2,908,283 | 10/59 | Kiffer | 137—525.3 XR |
| 2,941,544 | 6/60 | Peras | 137—525.1 XR |
| 2,990,849 | 7/61 | Peras | 137—515.7 |

M. CARY NELSON, *Primary Examiner*.

MARTIN P. SCHWADRON, *Examiner*.